United States Patent [19]

Borgers et al.

[11] Patent Number: 4,837,724
[45] Date of Patent: Jun. 6, 1989

[54] DISCRETE COSINE TRANSFORM ARRANGEMENT

[75] Inventors: Stephanus M. C. Borgers; Cornelis P. Visser, both of Eindoven, Netherlands

[73] Assignee: U.S. Philips Corporation, New York, N.Y.

[21] Appl. No.: 47,795

[22] Filed: May 6, 1987

[30] Foreign Application Priority Data

May 12, 1986 [NL] Netherlands ............... 8601183

[51] Int. Cl.$^4$ ........................... G06F 7/38; H04N 7/12
[52] U.S. Cl. ..................................... 364/725; 358/133
[58] Field of Search ............... 364/725, 726; 358/133, 358/135

[56] References Cited

U.S. PATENT DOCUMENTS

| | | | |
|---|---|---|---|
| 4,196,448 | 4/1980 | Whitehouse et al. | 364/725 |
| 4,225,850 | 9/1980 | Chang et al. | 364/726 |
| 4,385,363 | 5/1983 | Widergren et al. | 364/725 |
| 4,398,217 | 8/1983 | Peters | 382/56 |
| 4,405,936 | 9/1983 | Peters | 358/13 |
| 4,445,248 | 1/1981 | Netrasali et al. | 358/136 |
| 4,449,194 | 5/1984 | Wilhelm | 364/725 |
| 4,679,163 | 7/1987 | Arnold et al. | 364/725 |

OTHER PUBLICATIONS

Bacchi et al., "Real-Time Orthogonal Transformation of Colour-Television Pictures," *Philips Technical Review*, vol. 38 #4/5, 1978/1979, pp. 119–130.

Lee, "A New Algorithm to Compute the Discrete Cosine Transform", *IEEE Trans. On Acoustics, Speech and Signal Processing*, vol. ASSP-32, #6 Dec. 1984, 1243–1245.

Chen et al., "A Fast Computational Algorithm for the Discrete Cosine Transform", *IEEE Trans. on Communications*, vol. COM-25, #9, Sep. 1977, pp. 1004–1009.

*Primary Examiner*—Gary V. Harkcom
*Assistant Examiner*—Dale M. Shaw
*Attorney, Agent, or Firm*—Edward W. Goodman

[57] ABSTRACT

In a discrete cosine transformation (DCT) arrangement with an equivalent distribution between accuracy of intermediate results and the number of calculation operations to be performed, the group of N input samples is first subjected to a shuffle operation (903). Consequently, these input samples are applied to a combination circuit (90) in a sequence which is different from the sequence in which they are received. The combination circuit (90) supplies the sum and the difference of each two successive input samples. A selection circuit (91) continuously returns all sum samples except the last one to the input of the combination circuit. Each difference sample and the last sum sample is multiplied once in a multiplier (92) by one weighting factor from a group of weighting factors and the product samples obtained thereby are group-wise accumulated in an accumulator circuit (93), with each group supplying a transform coefficient.

7 Claims, 5 Drawing Sheets

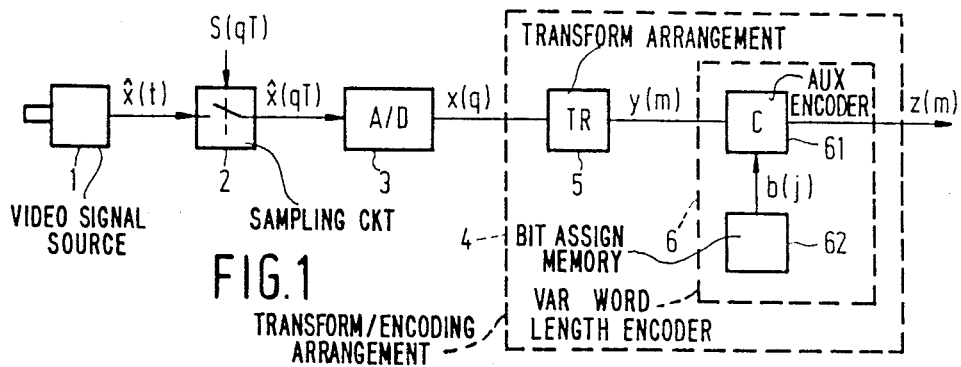
FIG.1
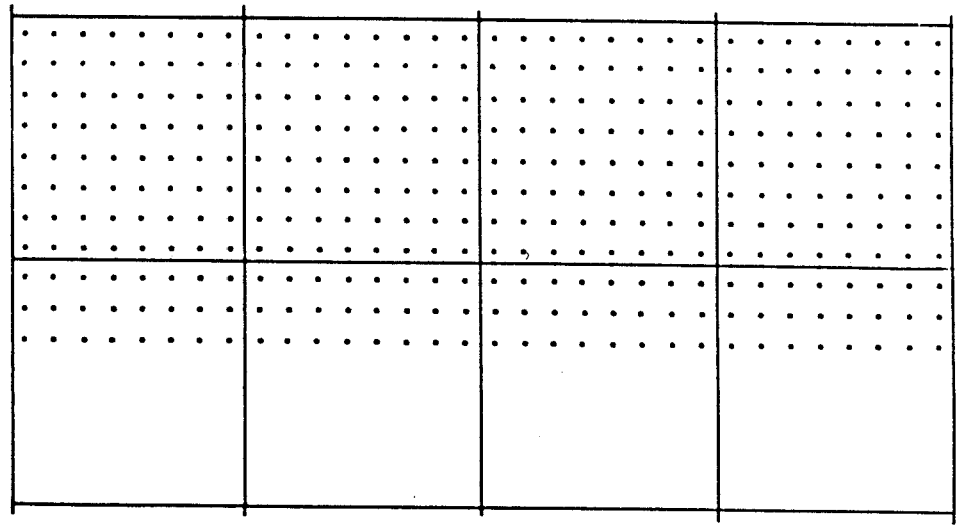
FIG.2
$$\begin{pmatrix} 0.177 & 0.245 & 0.231 & 0.208 & 0.177 & 0.139 & 0.096 & 0.049 \\ 0.177 & 0.208 & 0.096 & -0.049 & -0.177 & -0.245 & -0.231 & -0.139 \\ 0.177 & 0.139 & -0.096 & -0.245 & -0.177 & 0.049 & 0.231 & 0.208 \\ 0.177 & 0.049 & -0.231 & -0.139 & 0.177 & 0.208 & -0.096 & -0.245 \\ 0.177 & -0.049 & -0.231 & 0.139 & 0.177 & -0.208 & -0.096 & 0.245 \\ 0.177 & -0.139 & -0.096 & 0.245 & -0.177 & -0.049 & 0.231 & -0.208 \\ 0.177 & -0.208 & 0.096 & 0.049 & -0.177 & 0.245 & -0.231 & 0.139 \\ 0.177 & -0.245 & 0.231 & -0.208 & 0.177 & -0.139 & 0.096 & -0.049 \end{pmatrix}$$
FIG.4

DISCRETE COSINE TRANSFORM ARRANGEMENT

BACKGROUND OF THE INVENTION (1) Field of the Invention

The invention relates to an arrangement for real-time calculation of the discrete cosine transformation coefficients of a group of N inputs samples of a digital input signal. It is particularly intended for performing a transform coding of a digitalized video signal to reduce its bit rate. Such an arrangement will hereinafter be referred to as a DCT arrangement.

The invention also relates to an arrangement for calculating the original N input samples from the coefficients thus obtained. Such an arrangement will be referred to as an IDCT arrangement.

(2) Description of the Prior Art

As is generally known, transform coding is a data reduction method in which a television picture is divided into blocks of N×N picture elements and in which each block is considered to be a sum of a series of (N×N) mutually orthogonal basic pictures B(i,k) where i,k=0, ..., N−1, each with its own weighting factor y(i,k). Data reduction is possible because the information is concentrated only in a limited number of non-correlated basic pictures due to the correlation of the picture elements in a block, so that only the associated weight factors are important and the others can be ignored.

To indicate mathematically how the weighting factors are calculated, the block of N×N picture elements will be represented by an N×N matrix X, the weighting factors will be arranged in an N×N matrix Y and an N×N transform matrix A will be defined which is related to the set of basic pictures B(i, k). More particularly, there applies that:

$$B(i,k) = A_i A_k^T. \quad (1)$$

In this expression, $A_i$ represents a matrix in which each column is equal to the i-th column of the transform matrix A and $A_k^T$ represents a matrix each row of which is equal to the k-th row of the matrix A. The weighting factors now follow from the matrix multiplication $$Y = A^T X A. \quad (2)$$

In this expression, $A^T$ represents the transposed matrix of A. For more information relating to the above, reference is made to reference 1.

For the calculation of the weighting factors in accordance with expression (2), both the original transform matrix A and its transposed version $A^T$ must be available. However, expression (2) is equivalent to $$Y^T = (XA)^T A \quad (3)$$

Only the transform matrix A needs to be available for this matrix multiplication. More particularly, the product matrix P=XA can be calculated first. Subsequently, P can be transposed and finally $Y^T = P^T A$ can be calculated. An arrangement for performing the matrix multiplication indicated in expression (3) is described, for example in reference 2. For transposing P, use is made of an intermediate memory in which P is written in row by row and is read out column by column. Because both X and $P^T$ are multiplied by the same matrix A, one and the same circuit can be used for both multiplications.

In order to recover the original block of picture elements X from the weighting factors thus obtained, these weighting factors are subjected to an inverse transformation which is defined as follows:

$$X = AYA^T \quad (4)$$

In conformity with the foregoing this expression is equivalent to:

$$X = A(AY^T)^T \quad (5)$$

It is to be noted that a product matrix such as P=XA and $Y^T$=PA in expression (3) or $P'$=$AY^T$ and X=$AP'^T$ in expression (5) is obtained from a series of vector matrix multiplications. In fact, each row of, for example, X is multiplied by A in order to find the corresponding row of P.

The number of non-negligible weighting factors appearing from such a transformation is found to be closely related to the structure of the basic pictures chosen and hence to the transform matrix chosen. The most optimum transform matrix which is nowadays frequently used is the discrete cosine transform matrix whose elements a(i,k) are defined as follows:

$$a_{i,k} = Q\, e(k)\cos\{\pi(2i+1)k/2N\} \text{ for } i, k = 0,1,2,\ldots N-1 \quad (6)$$

$$\text{with } e(k) = 1/\sqrt{2} \text{ if } k = 0 = 1 \text{ if } k > 0$$

Q is a scaling constant which is equal to 2/N if this matrix is used to calculate the weighting factors for the direct transformation and which is equal to 1 if it is used for the inverse transformation.

When two N×N matrices are multiplied by each other in a conventional way, which in that case is referred to as the direct method, $N^2$ multiplications must be performed for each N product element of the product matrix and N(N−1) additions are required. A DCT arrangement whose implementation is based on this direct method is described, for example, in Reference 3. So-called fast methods are known from References 4 and 5 in which the desired result can be obtained with considerably fewer multiplications and additions. For example, only 13 multiplications are performed and only 29 additions are required when the method described in Reference 5 is used if N=8. The drawback of these known methods is that the intermediate results occurring during the calculation process must be very accurate due to subsequent further processing steps to be performed (this means that the word length of these intermediate results must be large). These further processing steps are notably multiplications.

OBJECT AND SUMMARY OF THE INVENTION

The invention has for its object to provide an alternative embodiment of a DCT arrangement in which considerably less stringent requirements need to be imposed on the accuracy of the intermediate results, possibly in exchange for an acceptable increase of the number of mathematical operations to be performed as compared with the DCT arrangement which is described in Reference 5.

According to the invention, a DCT arrangement comprises:

combining means to which the N-picture elements of a row of a block of N×N picture elements are applied and a number of auxiliary samples, and which is adapted to add and subtract predetermined combinations of picture elements, and to add and subtract predetermined combinations of auxiliary samples, for the purpose of generating sum and difference samples;

selection means receiving the sum and difference samples supplying said auxiliary samples as well as transfer samples, the auxiliary samples being constituted by selected ones of said sum- and difference samples and the transfer samples being constituted by the remaining sum and difference samples.

multiplication means receiving the transfer samples and multiplying each by only one weighting factor selected from a plurality of predetermined weighting factors for generating product samples; and accumulator means receiving the product samples and being adapted to accumulate given samples for generating the coefficients.

By using the invention, each incoming picture element is multiplied only once by some number, in this case the multiplication factor of the transform matrix, so that the accuracy of the intermediate results need to be no greater than the accuracy with which the coefficients are desired. However, this is accompanied by an increase of the number of mathematical operations to be performed (at least compared with the DCT arrangement described in Reference 5). In fact, in this DCT arrangement according to the invention, approximately b 22 multiplications and 34 additions (comprising 20 accumulation operations) are found to be necessary in the case of N=8, which numbers are, nevertheless, found to be very acceptable for practical uses.

REFERENCES

1. Real-time orthogonal transformation of colour-television pictures; H. Bacchi, A. Moreau; Philips Technical Review, Vol. 38, No. 4/5, 1978/1979, pages 119–130.

2. Method of and arrangement for digitizing a colour video signal; J. H. Peters, U.S. Pat. No. 4,405,936.

3. Multiple Point, Discrete Cosine Processor; L. W. Randy, A. Mesa; U.S. Pat. No. 4,449,194.

4. A Fast Computational Algorithm For The Discrete Cosine Transform; W. H. Chen, C. H. Smith, S. C. Fralick; IEEE Transactions on Communications, Vol. COM-25, No. 9, September 1977, pages 1004–1009.

5. A New Algorithm To Compute The Discrete Cosine Transform, B. G. Lee; IEEE Transactions on Acoustics, Speech and Signal Processing, Vol. ASSP-32, No. 6, December 1984, pages 1243–1245.

6. Method of and arrangement for digitizing a time-discrete video signal using a picture transform coding; J. H. Peters; U.S. Pat. No. 4,398,217.

SHORT DESCRIPTION OF THE DRAWING FIGURES

FIG. 1 diagrammatically shows a transform and encoding arrangement for video signals;

FIG. 2 shows at which instants these signals are sampled. The Figure also shows the signal samples which together form a block;

FIG. 4 shows an 8×8 DCT transform matrix;

Figure 3:
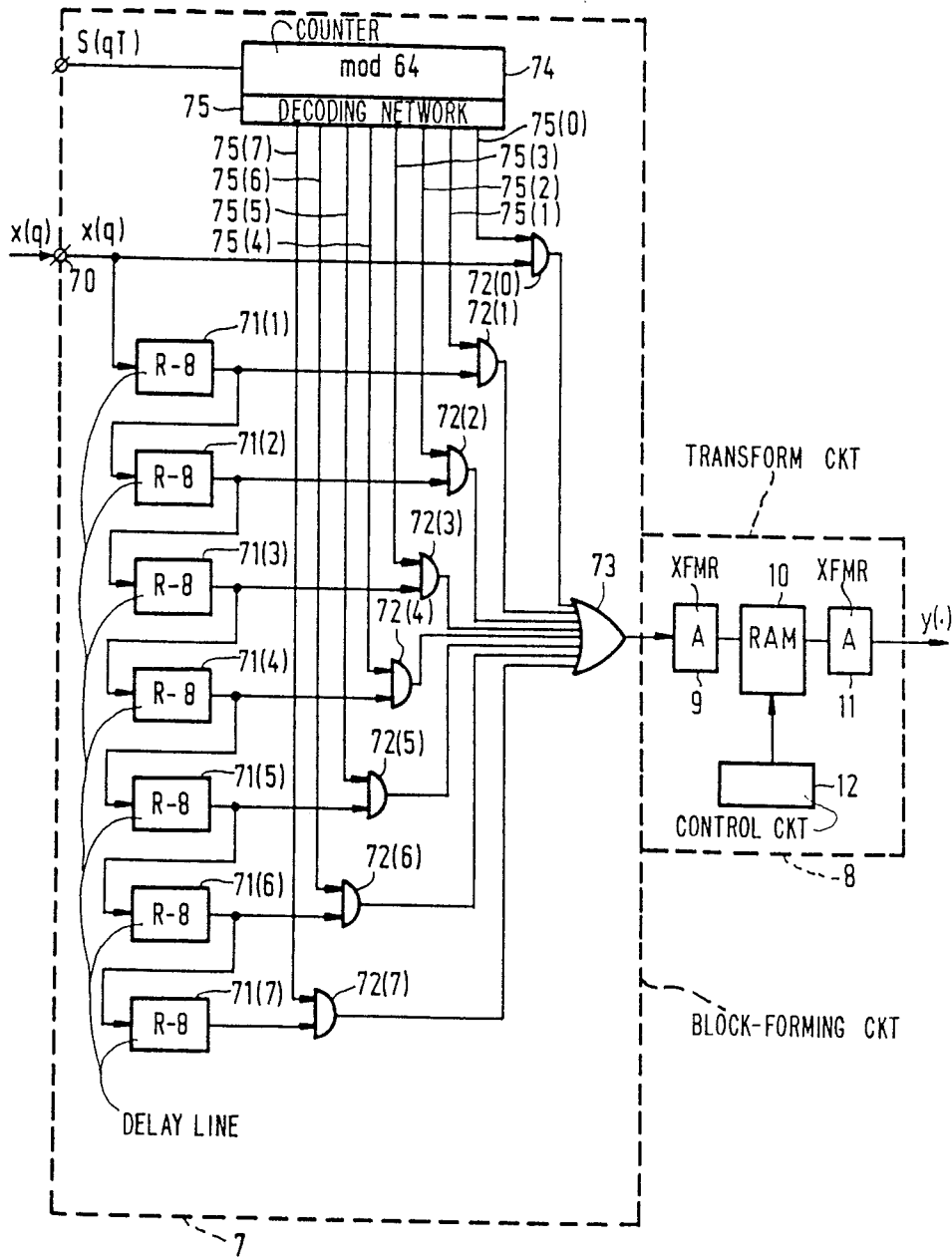

EXPLANATION OF THE INVENTION (1) The transform coding arrangement.

FIG. 1 shows diagrammatically a transform and encoding arrangement for video signals. It comprises a video signal source 1 supplying a video signal $\tilde{x}(t)$. This signal is applied to a sampling circuit 2 which takes samples $\tilde{x}(qT)$ from this video signal under the control of sampling pulses $S(qT)$. In this case there applies that $q = \ldots, -1, 0, 1, 2, \ldots$ and that the sampling pulses occur at a frequency $f_s = 1/T$. These video signal samples are then supplied to an analog-to-digital converter 3 which supplies the digital video signal samples $x(q)$. These digital samples are applied in their turn to a transform and encoding arrangement 4 for generating the desired transformation weighting factors. It comprises, more specifically, a transform arrangement 5 which receives the digital video signal samples $x(q)$ and converts them in transform weighting factors $y(m)$. These weighting factors are subsequently applied to a variable word length encoder 6 which converts each transform weighting factor into a code word $z(m)$ of suitable word length. It comprises an auxiliary encoder 61 which receives the transform weighting factors and ensures the actual encoding. The word length of the code word $z(m)$ is determined by a quantity $b(j)$ which is supplied by a bit assignment memory 62. This auxiliary encoder 61 thus supplies code words $z(m)$ varying in length and also ensures that given transform weighting factors $y(m)$ are ignored in that no bit is made available for their encoding. A particularly favorable embodiment of the encoder 6 is described in Reference 6. It is to be noted that the samples taken from a video signal and hence from a video picture are shown diagrammatically by means of dots in FIG. 2.

An embodiment of the transform arrangement 5 is shown for the sake of completeness in FIG. 3. It is provided with a block-forming circuit 7 and a transform circuit 8. The block-forming circuit 7 partitions a picture into blocks of N×N picture elements (video signal samples), for example, in the manner as shown for N=8 in FIG. 2. To this end, it has an input 70 which receives the successively occurring digital video signal samples $x(q)$. A cascade arrangement of N−1 (=7) delay lines 71(.) each having a capacity of R-8 video signal samples is connected to this input 70. R is the number of video signal samples of a television line. The input 70 of this block-forming circuit 7 and the outputs of each delay line 71 (.) are connected via respective AND-gate circuits 72(.) to inputs of an OR-gate circuit 73. Each AND-gate circuit 72(.) also receives 8 control pulses in such a manner that first 8 video signal samples are applied from the delay line 71(7) to the transform circuit, then 8 video signal samples from the delay line 71(6), then 8 video signal samples from the delay line 71 (5), and so forth. These control pulses are generated by a modulo-64 counter 74 to which the sampling pulses $S(qT)$ are applied. A decoding network 75, having eight outputs 75 (.) which are connected to inputs of the AND-gate circuits 72(.), is connected to this counter 74. This decoding network supplies a logic "1" at the output 75(7) each time the counter has one of the computing positions 1, 2, 3, ... 8. A logic "1" occurs at the output 75(6) each time the counter has one of the counting positions 9, 10, 11, ... 16 and so forth. In this manner the video signals of a block occur successively and row by row at the output of the OR-gate circuit 73.

The transform circuit 8 is constituted by a first transformer 9, a memory 10 and a second transformer 11. These transformers have the same structure and are each constituted by a DCT arrangement. In this case the transformer 9 supplies the product matrix P=XA (see expression (3)) which consists of the coefficients $p_{i,k}$. These coefficients are written row by row into the memory 10 under the control of a control circuit 12 and read from this memory column by column. In this manner the transposed product matrix $P^T$ is obtained which is applied to the transformer 11.

(2) The DCT arrangement, general structure.

In the transformer 9 or 11 formed as a DCT arrangement all N picture elements of a row in a block are multiplied by all N columns of the DCT transform matrix A whose elements are defined in expression (6) and which is shown in FIG. 4 for N=8. As is apparent from this Figure, this DCT matrix has a very specific structure due to the periodical character of the goniometric function. When the digital video signal samples of the i-th row of an 8×8 block are represented by $x_{i,0}$, $x_{i,1}$, ... $x_{i,7}$ and when the coefficients of the i-th row of the product matrix P are represented by $p_{i,0}$, $p_{i,1}$, ... $p_{i,7}$ then the relationship shown in Table 1 applies between the two. In Table 1 a shorter way of writing has been used for the elements $a_{i,k}$ of the DCT matrix. The magnitude of each element $a_{i,k}$ has been replaced by a transform element $C_q^m$, defined as follows:

$$C_q^m = 2/N \cos[(m/q)\pi] \quad (7)$$

TABLE 1

$p_{i,0} = C_{16}^4[\{(X_{i,0} + X_{i,7}) + (X_{i,3} + X_{i,4})\} + \{(X_{i,1} + X_{i,6}) + (X_{i,2} + X_{i,5})\}]$ $p_{i,4} = C_{16}^4[\{(X_{i,0} + X_{i,7}) + (X_{i,3} + X_{i,4})\} - \{(X_{i,1} + X_{i,6}) + (X_{i,2} + X_{i,5})\}]$ $p_{i,2} = C_{16}^2\{(X_{i,0} + X_{i,7}) - (X_{i,3} + X_{i,4})\} + C_{16}^6\{(X_{i,1} + X_{i,6}) - (X_{i,2} + X_{i,5})\}$ $p_{i,6} = C_{16}^6\{(X_{i,0} + X_{i,7}) - (X_{i,3} + X_{i,4})\} - C_{16}^2\{(X_{i,1} + X_{i,6}) - (X_{i,2} + X_{i,5})\}$ $p_{i,1} = C_{16}^1(X_{i,0} - X_{i,7}) + C_{16}^7(X_{i,3} - X_{i,4}) + C_{16}^3(X_{i,1} - X_{i,6}) + C_{16}^5(X_{i,2} - X_{i,5})$ $p_{i,3} = C_{16}^3(X_{i,0} - X_{i,7}) - C_{16}^5(X_{i,3} - X_{i,4}) - C_{16}^7(X_{i,1} - X_{i,6}) - C_{16}^1(X_{i,2} - X_{i,5})$ $p_{i,5} = C_{16}^5(X_{i,0} - X_{i,7}) + C_{16}^3(X_{i,3} - X_{i,4}) - C_{16}^1(X_{i,1} - X_{i,6}) + C_{16}^7(X_{i,2} - X_{i,5})$ $p_{i,7} = C_{16}^7(X_{i,0} - X_{i,7}) - C_{16}^1(X_{i,3} - X_{i,4}) - C_{16}^5(X_{i,1} - X_{i,6}) + C_{16}^3(X_{i,2} - X_{i,5})$

In the above case N=8 so that q=16. Now it holds, for instance that $a_{i,k} = 2/(N\sqrt{2})$ which for N=8 is equal to $2/N \cos(4\pi/16)$ which is equal to $C_{16}^4$.

Figure 5:
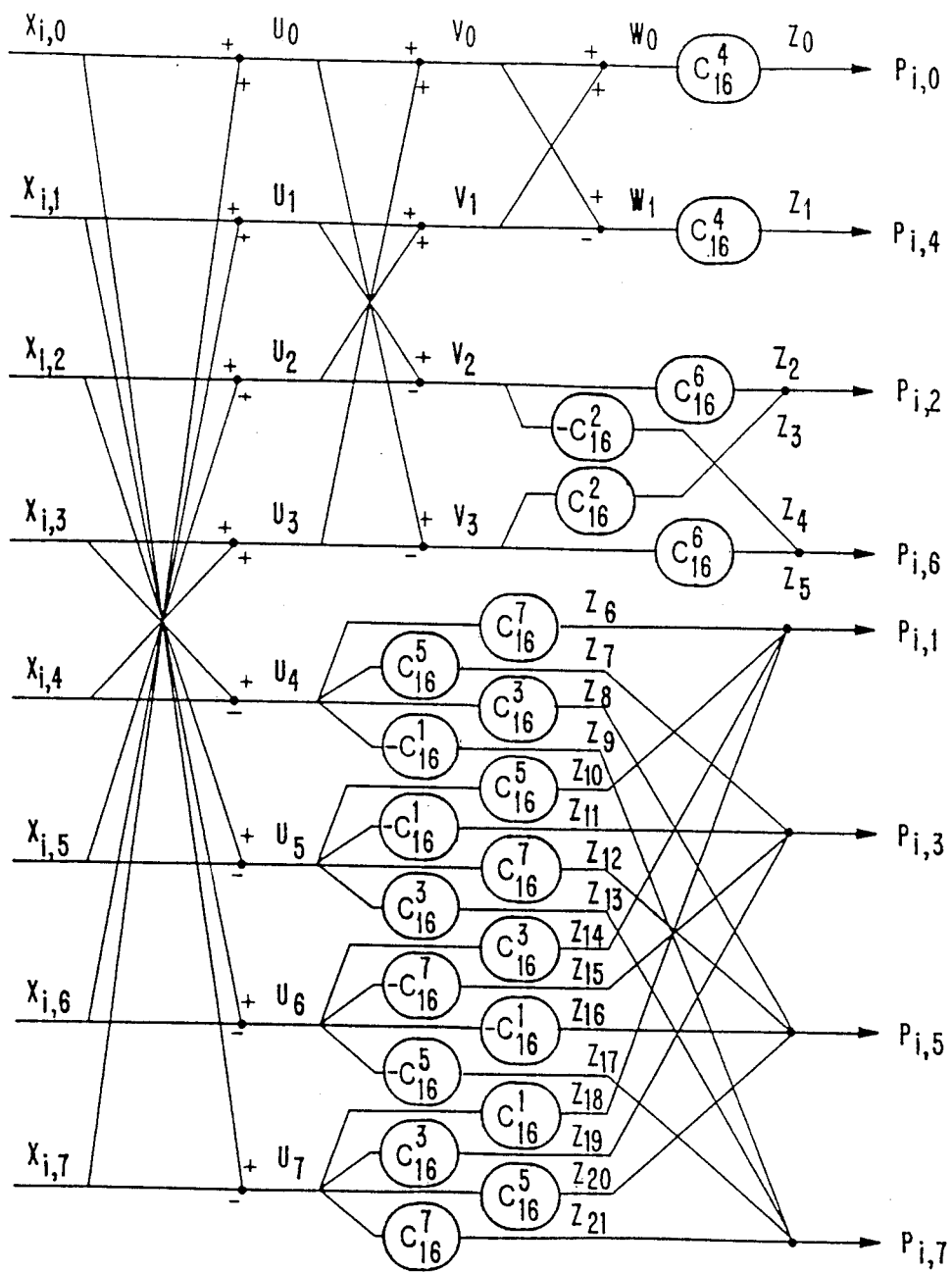
FIG. 5 shows a diagram representing a new DCT-algorithm.

A diagram representing the algorithm worked out for N=8 in Table 1 is shown in FIG. 5. It appears from this Figure that for calculating the coefficients $p_{i,k}$, it is possible to first add or subtract those digital video signal samples which have to be multiplied by equal transform elements $C_q^m$. Only after that is the multiplication really performed. It is also apparent from FIG. 5 that if N=8, not more than 22 multiplications, 14 additions and 20 accumulation operations are required per group of eight coefficients. In this respect, it is to be noted that two or more multiplications do not occur in any branch of the diagram, which property is important for determining the word length of the intermediate results. In FIG. 5 these intermediate results are denoted by the characters u, v, w, z.

Figure 6:
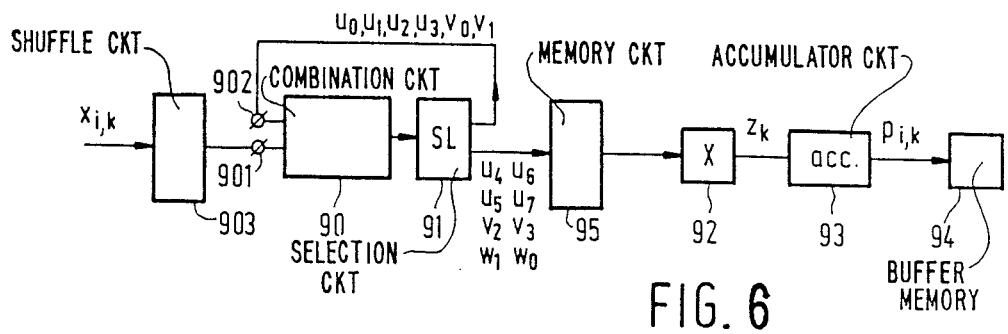
FIG. 6 shows the DCT arrangement according to the invention based on the algorithm of FIG. 5.

An embodiment of the DCT arrangement whose implementation is based on the new DCT algorithm shown in FIG. 5 is shown in FIG. 6. It comprises a shuffle circuit 903 to which the digital video signal samples are applied in the sequence $x_{i,0}, x_{i,2}, \ldots x_{i,7}$. It supplies the same video signal samples but in a different sequence, more specifically as follows $x_{i,0}, x_{i,7}, x_{i,3}, x_{i,4}, x_{i,1}, x_{i,6}, x_{i,2}, x_{i,5}$. In this sequence they are applied via an input 901 to a combination circuit 90. Auxiliary samples are also applied thereto via an input 902. Addition and subtraction operations are performed on these video signal samples and auxiliary samples so that the sum and difference samples denoted by $u_0$ to $u_7$ inclusive in FIG. 5 and bracketed in Table 1 are obtained. These sum and difference samples are applied to a selection circuit 91 which applies the sum samples $u_0$, $u_1$, $u_2$, $u_3$, $v_0$, $v_1$ shown in FIG. 5 as auxiliary samples to the input 902 of the combination circuit 90. The difference samples $u_4$, $u_5$, $u_6$, $u_7$, $v_2$, $v_3$, $w_1$ as well as the sum sample $w_0$ are applied as transfer samples to a multiplier circuit 92 in which these transfer samples are multiplied by the associated transform elements shown in FIG. 5. The product samples $z_0$ to $z_{21}$ inclusive shown in FIG. 5 are thereby obtained. These are applied to an accumulator circuit 93 which, as is shown in FIG. 5, adds given product samples together to obtain the desired coefficients $p_{i,m}$. These coefficients may be stored temporarily in a buffer memory 94.

In the embodiment shown, a memory circuit 95 as a buffer circuit is incorporated for practical reasons between the selection circuit 91 and the multiplier circuit 92. This has been done because the rate at which mathematical operations must be performed in the combination circuit 90 can be lower than the rate at which mathematical operations must be performed in the multiplier circuit 92.

(3) The DCT arrangement, detailed structure.

Figures 7, 9:
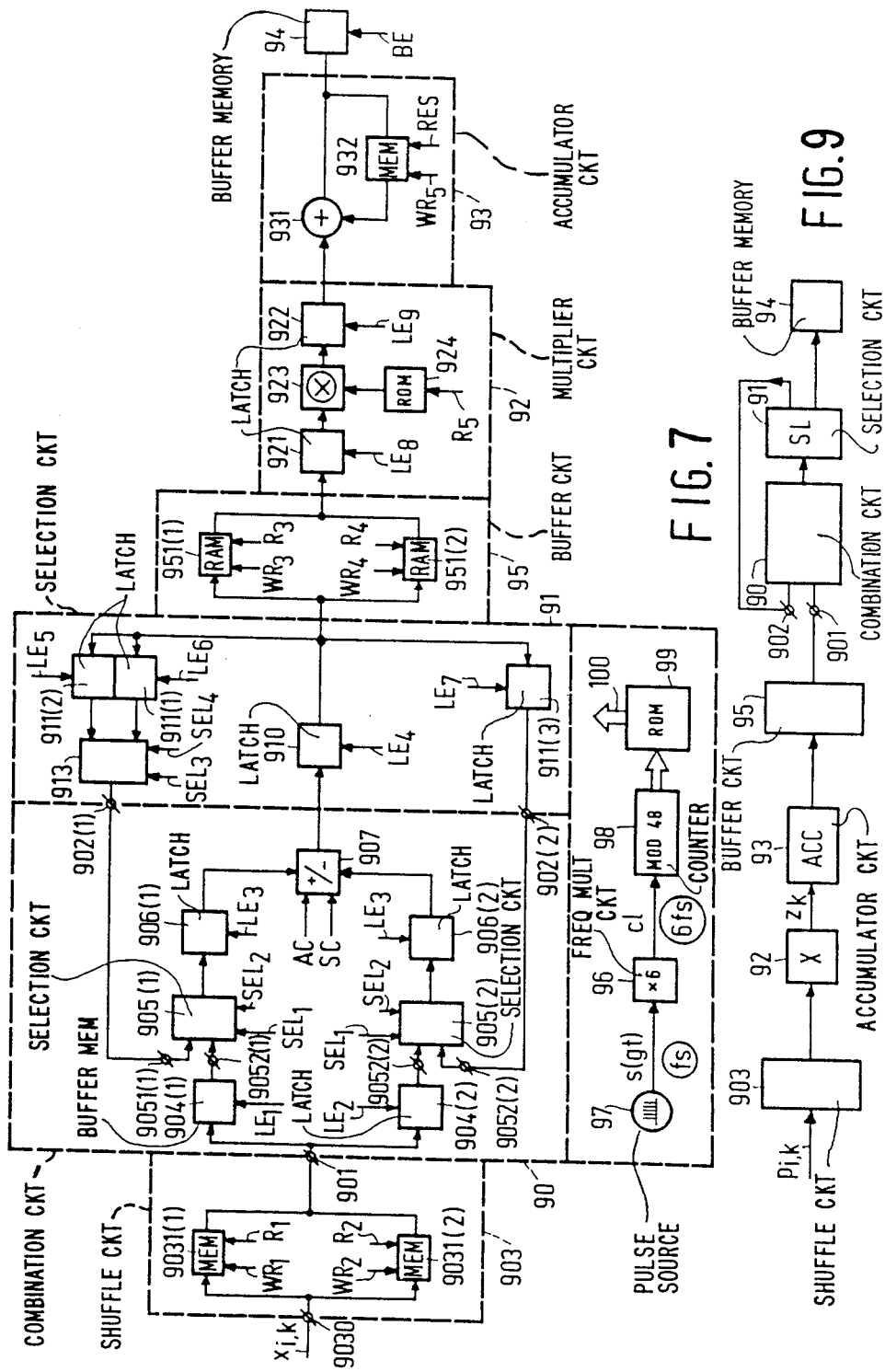
FIG. 7 shows a further embodiment of the DCT arrangement of FIG. 6.
FIG. 9 shows an IDC arrangement according to the invention.

FIG. 7 shows a more detailed embodiment of the DCT arrangement. The operation of this arrangement is diagrammatically shown in Table 2. More particularly, the first column in Table 2 indicates the reference numbers of a number of memories present in FIG. 7 and the other columns represent the contents of these memories after a clock pulse has occurred. These clock pulses are enumerated 1 to 53, inclusive in the first row. In this Table, the indices i as used in the foregoing as well as in FIG. 5 have been omitted for the video signal samples and for the coefficients. It is to be noted that in this Table 2, a dash "-" means that the content of the relevant memory is unchanged.

In the DCT arrangement which is shown in FIG. 7 the shuffle circuit 903 is constituted by two memories 903 (.) with addressable memory locations; for example, RAMs. Each of them receives the digital video signal samples $x_{i,k}$. These memories are controlled by write and read address commands $WR_j$ and $R_j$ in such a manner that the presented digital video signal samples are written into one of them, while simultaneously the digital video signal samples present in the other memory are read therefrom. The digital video signal samples $x_{i,0}$, $x_{i,3}$, $x_{i,1}$, $x_{i,2}$ read from this memory in response to one of the clock pulses 1, 7, 13, 19 shown in Table 2 are temporarily stored in the combination circuit 90 in a buffer memory 904(1) which may be formed as a latch and is controlled by a latch enable command $LE_1$. The digital video signal samples $x_{i,7}$, $x_{i,4}$, $x_{i,6}$, $x_{1,5}$ read from this memory 903(.) in response to one of the clock pulses 4, 10, 16, 22 are applied in the combination circuit 90 to latch 904(2) which is controlled by latch enable command $LE_2$. The actual contents of the two latches 904(.) are applied in response to each further clock pulse 6, 12, 18, 24, 30, 36, 45 via selection circuits 905(.) to latches 906(.) which take over these actual contents in response to the occurrence of the latch enable command $LE_3$.

Figure 8:
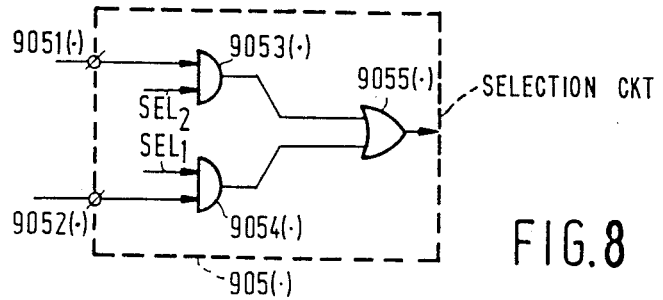
FIG. 8 shows a selection circuit for use in the arrangement of FIG. 7.

The selection circuits 905(.) are built up in the same manner and each have two inputs 9051(.) and 9052(.) The inputs 9052(.) receive the digital video signal sample which is stored in latch 904(.) and the inputs 9051(.) receive auxiliary samples which are applied via inputs 902(.) to the combination circuit. These selection circuits 905(.) also receive two control commands $SEL_1$ and $SEL_2$ which ensure that either the digital video signal sample from latch 904(.) or the auxiliary sample at input 9051(.) is stored in latch 906(.). As is shown in FIG. 8, this selection circuit may be simply formed by two AND-gate circuits 9053(.) and 9054(.) and an OR-gate circuit 9055(.). In this way it is achieved that, for example, after the occurrence of clock pulse 6, latches 906(.) comprise the digital video signal samples $x_{i,0}$ and $x_{i,7}$, while these latches comprise the auxiliary samples $u_1$ and $u_2$ after the occurrence of, for example, clock pulse 36.

The samples present in the latches 906(.)

TABLE 2

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| | | | | | | | | | | | | | | | | | | | | | | | | | | | |
| | | | | | | | | | | | | | | | | | | | | | | | | | | | |
| | | | | | | | | | | | | | | | | | | | | | | | | | | | |
| 904(1) | $X_0$ | | | $X_7$ | | | $X_3$ | | | $X_4$ | | $X_3$ | $X_1$ | | | $X_6$ | | $X_1$ | $X_2$ | | | $X_5$ | | $X_2$ | | | |
| 904(2) | | | | | | $X_0$ | | | | | | $X_4$ | | | | | | $X_6$ | | | | | | $X_5$ | | | |
| 906(1) | | | $W_0$ | | | $X_7$ | | | | | | | | | | | | $X_3$ | | | | | | $X_1$ | | | |
| 906(2) | | | | | | | | | | | | | | | | | | | | | | | | | | | |
| 910 | | | | | | | | | $U_7$ | | | $U_0$ | $U_0$ | | $U_4$ | | | | $U_3$ | $U_6$ | $U_6$ | | | $U_1$ | $U_1$ | | $U_5$ |
| 911(1) | | | | | | | | | | $U_7$ | | | | | | $U_4$ | | | | | | | | | | | |
| 911(2) | | | | | | | | | | | | | | | | | | | | | | $U_6$ | | | | | |
| 911(3) | | | | | | | | | | | | | | | | | | | | | | | | | | | |
| 951(1) | | | | $W_0$ $U_7$ | | | | | | | | | | | | | | | | | | | | | | | |
| | | | | | | | | | | | | | | | | | | | | | | | | | | | |
| 951(2) | | | | $U_4$ $U_6$ $U_5$ $V_3$ $V_2$ $V_1$ $W_0$ | | | | | | | | | | | | | | | | | | | | | | |
| 921 | | | | $P_1$ $P_3$ $P_5$ $P_7$ $P_6$ $P_2$ | | | | | | | | | | | | | | | | | | | | | | |
| 922 | | | | $P_4$ $P_0$ | | | | | | | | | | | | | | | | | | | | | | |
| 94 | | | | | | | | $U_4$ $Z_{18}$ | | $U_6$ $Z_6$ | | $U_5$ $Z_{14}$ | | $U_7$ $Z_{10}$ | | $U_4$ $Z_{19}$ $P_1$ | | $U_6$ $Z_7$ | | $U_5$ $Z_{15}$ | | $U_7$ $Z_{11}$ | | $U_4$ $Z_{20}$ $P_1$ | | $U_6$ $Z_8$ | |

| | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 |
|---|---|---|---|---|---|---|---|---|---|---|---|---|---|---|---|---|---|---|---|---|---|---|---|---|---|---|
| 904(1) | | | $U_0$ | | | | | | $U_1$ | | | | | | | | | $V_0$ | | | $X_0$ | | | | | |
| 904(2) | | | $U_3$ | | | | | | $U_2$ | | | | | | | | | $V_1$ | | | | | | | $X_7$ | |
| 906(1) | | | $U_2$ | | | $V_3$ | | | $V_0$ | $V_0$ | | $V_2$ | | | $V_1$ | $V_1$ | | | | | $W_1$ | | | $W_0$ | | |
| 906(2) | | | | $U_2$ | | | | | | | | | | | | | | | | | | | | | | |
| 910 | | | | | | | | | | | | | | | | | | | | | | | | | | |
| 911(1) | | | | | | | | | | | | | | | | | | | | | | | | | | |
| 911(2) | | | | | | | | | | | | | | | | | | | | | | | | | | |
| 911(3) | | | | | | | | | | | | | | | | | | | | | | | | | | | are applied to an adder-subtractor circuit 907 which is controlled by an adding command AC and a subtraction command SC. This circuit 907 subtracts each time the two samples present in the latches 906(1) and 906(2) so that the difference samples $u_7, u_4, u_6, u_5, v_3, v_2, w_1$ are obtained. They are also added together so that the sum samples $u_0, u_3, u_1, u_2, v_0, v_1, w_0$ are obtained. Each sample is applied to the selection circuit 91 where such a sample, in response to the occurrence of a latch enable command $LE_4$ (coinciding with the clock pulses 3, 9, 12, 15, 18, 21, 24, 27, 30, 33, 36, 39, 42, 28, 51), is taken up in a latch 910. Each difference sample and the same sample $w_0$ is subsequently applied directly as a transfer sample to the buffer circuit 95. The other sum samples are temporarily stored in one of the three latches 911(.) which are controlled by the latch enable commands $LE_5$, $LE_6$ and $LE_7$, respectively. Table 2 shows in detail which sum sample is stored in which latch. It is also apparent from this Table when this happens and when such sum samples are applied as auxiliary samples to the latches 906(.) For example, the sum samples $u_0$ and $u_3$ are stored in response to clock pulse 30 in the latches 906(1) and 906(2), respectively, so as to subsequently supply the difference sample $v_3$ which in response to clock pulse 33 is stored in latch 910 to be transferred in its turn to the buffer circuit 95 in response to clock pulse 34. The sum sample $u_0$ supplied in response to the two sum samples $u_0$ and $u_3$ by the adder-subtractor circuit is stored in latch 910 in response to clock pulse 36 and is subsequently stored in latch 911(1) in response to clock pulse 37, and so forth, As is apparent from Table 2, all eight video signal samples $x_{i,0}$ to $x_{i,7}$ inclusive are converted after 52 clock pulses into the eight transfer samples $u_4, u_5, u_6, u_7, v_2, v_3, w_0, w_1$ which are all present in the store 951(1) at that instant.

The buffer circuit 95 is built up in the same manner as the shuffle circuit 903. It also comprises two RAM's 951(.) which are controlled by the read and write address commands $R_j$ and $WR_j$, respectively. Also in this case the control is such that all transfer samples which are calculated, starting from a given group of digital video signal samples $x_{i,k}$ which are present in one of the memories 9031(.), are written into one of the memories 951 (.). In Table 2, it is assumed that the actually calculated transfer samples are written into memory 951(1) and that the memory 951(2) comprises all transfer samples which are calculated in the previous cycle of 52 clock pulses. As is shown in Table 2 this means that after the fourth clock pulse, the memory 951(2) comprises a completely new set of transfer samples.

To calculate the desired transformation coefficients, these transfer samples are also applied to the multiplier circuit 92. This circuit 92 comprises two further latches 921 and 922 which are controlled by latch enable commands $LE_8$ and $LE_9$, respectively. A multiplier 923, which receives the transform elements $C_q^m$ from a memory 924, for example, a ROM, is incorporated between the two latches 921 and 922. This ROM is controlled by an address command $R_5$. The content of latch 922 is applied to the accumulator circuit 93 which is built up in known manner and comprises an adder circuit 931 and a memory 932. This memory, which can only comprise one word supplied by the adder 931, is reset by means of a reset command RES. The sum number supplied by the adder 931 is written into the memory 932 in response to a write command $WR_5$. This sum number may also be written into the buffer memory 94 by means of a further write command BE.

As is shown in Table 2, the transfer samples $u_7, u_4, u_6, u_5$ are written into the latch 921 in response to the clock pulses 6, 8, 10 and 12, respectively, multiplied by the transform elements $C_{16}^1, C_{16}^7, C_{16}^3, C_{16}^5$, respectively, so that the product samples $Z_{18}, z_6, z_{14}$ and $z_{10}$ are successively obtained which are accumulated in the accumulator circuit 93 so that the transform coefficient $P_{i,1}$ can be written into the buffer memory 94 in response to clock pulse 16. Correspondingly, the other transform coefficients are obtained so that this buffer memory 94, in response to clock pulse 52, comprises a completely new set of eight transform coefficients. As is shown in Table 2, the same situation occurred at the instant after the occurrence of the fourth clock pulse.

The above-mentioned clock pulses occur at a rate which is, for example, six times as high as the sampling frequency $f_s$ at which the video signal samples occur. With the aid of a frequency multiplier circuit 96, they are derived from the sampling pulses S(qT) which are supplied by a pulse source 97. These clock pulses are also used to generate the various commands. They are therefore applied to a modulo-48 counter 98 whose counting position is applied as an address to a memory 99 with addressable memory locations; for example, a ROM. Each memory location comprises the values "0" and "1" of all commands. These commands are applied to the different elements by means of a bus 100 consisting of many lines.

As already expressed in the opening paragraph, an inverse transformation is to be performed on the ultimately obtained weighting factors in order to recover the original picture elements. This inverse transformation requires an inverse discrete cosine transformation. It can be realized by means of the IDCT arrangement shown in FIG. 9. It differs from the DCT arrangement of FIG. 6 exclusively in the location of the circuit combinations 90, 91 and 92, 93.

We claim:

1. An arrangement for real-time calculation of discrete cosine transformation coefficients of a group of N signal samples of a time-discrete input signal, comprising:

combination means receiving the signal samples as well as a number of auxiliary samples for adding and subtracting predetermined combinations of said signal samples and said auxiliary samples for generating sum and difference samples;

selection means receiving the sum and difference samples and supplying said auxiliary samples as well as transfer samples, the auxiliary samples being constituted by selected ones of the sum and difference samples and the transfer samples being comprised by the remaining sum and difference samples;

multiplication means receiving the transfer samples and multiplying each by only one weighting factor selected from a plurality of predetermined weighting factors for generating product samples; and accumulator means receiving the product samples for accumulating given samples of said product samples for generating the coefficients.

2. An arrangement as claimed in claim 1, wherein the auxiliary samples are comprised by sum samples.

3. An arrangement as claimed in claim 1 further comprising shuffle means to which the N-signal samples are applied in a first sequence and which supplies these signal samples in a second sequence which corresponds to the combinations of samples to be added or to be subtracted.

4. An arrangement as claimed in claim 1 wherein the combination means comprises two memories for storing a first and a subsequent second sample, which samples are applied to an adder-subtractor circuit and are supplied by a selection circuit which receives signal samples and the auxiliary samples and which applies them selectively to the two memories.

5. An arrangement for real-time calculation of N inverse discrete cosine transformation signal samples of a time-discrete signal from a group of N discrete cosine transformation coefficients, comprising:

multiplication means receiving the coefficients and multiplying each by only one weighting factor selected from a plurality of predetermined weighting factors for generating product samples;

accumulator means receiving the product samples for adding each time given samples of said product samples together for generating accumulation samples;

combination means receiving the accumulation samples as well as a number of auxiliary samples for adding and subtracting predetermined combinations of said accumulation samples and auxiliary samples for generating sum and difference samples; and selection means receiving the sum and difference samples and supplying said auxiliary samples as well as transfer samples, the auxiliary samples being comprised by selected ones of the sum and difference samples and the transfer samples being comprised by the remaining sum and difference samples.

6. An arrangement as claimed in claim 5 further comprising shuffle means to which the N-coefficients are applied in a first sequence and which supplies these coefficients in a second sequence which corresponds to the combinations of coefficients to be added or to be subtracted.

7. An arrangement as claimed in claim 5 wherein the combination means comprises two memories for storing a first and a subsequent second sample, said first and second samples being applied to an adder-subtractor circuit and being supplied by a selection circuit which receives the accumulation samples and the auxiliary samples and which applies them selectively to the two memories.

* * * * *